(12) United States Patent
Mercure (10) Patent No.: US 9,598,060 B2
(45) Date of Patent: Mar. 21, 2017

(54) SAFETY BRAKE SYSTEM FOR TRAILERS

(75) Inventor: Roger Mercure, Mascouche (CA)

(73) Assignee: Roger Mercure, Mascouche, QC (CA)

( * ) Notice: Subject to any disclaimer, the term of this patent is extended or adjusted under 35 U.S.C. 154(b) by 1000 days.

(21) Appl. No.: 13/825,896

(22) PCT Filed: Sep. 23, 2011

(86) PCT No.: PCT/CA2011/050594
§ 371 (c)(1),
(2), (4) Date: Jul. 4, 2014

(87) PCT Pub. No.: WO2012/037693
PCT Pub. Date: Mar. 29, 2012

(65) Prior Publication Data
US 2014/0311837 A1    Oct. 23, 2014

Related U.S. Application Data

(60) Provisional application No. 61/385,666, filed on Sep. 23, 2010.

(51) Int. Cl.
*B60T 7/20* (2006.01)
*F02B 43/10* (2006.01)
(Continued)

(52) U.S. Cl.
CPC ...... *B60T 7/20* (2013.01); *B60T 1/06* (2013.01); *B62D 63/08* (2013.01); *F01N 3/101* (2013.01);
(Continued)

(58) Field of Classification Search
CPC ......... B62D 53/062; B62D 63/08; B60T 1/06; B60T 7/20; F01N 3/101; F02B 7/06;
(Continued)

(56) References Cited

U.S. PATENT DOCUMENTS 2,399,746 A * 5/1946 Klaus ......................... B60T 7/20
                                                                188/112 R
2,853,317 A * 9/1958 Waddle .................. B60D 1/065
                                                                280/511
(Continued)

FOREIGN PATENT DOCUMENTS

GB          1387274 A      3/1975
WO      2010096934 A1     9/2010

*Primary Examiner* — Vishal Sahni
(74) *Attorney, Agent, or Firm* — Norton Rose Fulbright Canada LLP (57) ABSTRACT

A safety brake system for a trailer comprises a brake unit to brake the trailer. An actuation unit comprises a mount secured to a front end of the trailer. A brake interface is operatively supported by the mount for displacement with respect to the trailer. The brake interface is displaceable toward a deactivation state in which the brake interface releases the brake unit from braking the trailer. A probe is operatively supported by the mount for displacement with respect to the trailer, the probe being displaceable between a hitching state in which the probe is adapted to contact the hitch of a vehicle, and a blocking state in which the probe blocks a hitch coupler of the trailer to prevent hitching of the trailer to a vehicle A biasing unit biases the probe against the hitch of the trailer in the hitching state and toward the blocking state. A mechanism operatively connects the brake interface to the probe, the mechanism retaining the brake interface in the deactivated state when the probe is in the hitching state, the mechanism releasing the brake interface from the deactivated state when the probe moves to the blocking state. A method for deactivating a safety brake is also provided.

15 Claims, 9 Drawing Sheets

(51) Int. Cl.

| | |
|---|---|
| *F02D 41/30* | (2006.01) |
| *F01N 3/10* | (2006.01) |
| *F02D 19/10* | (2006.01) |
| *F02D 41/40* | (2006.01) |
| *F02B 7/08* | (2006.01) |
| *F02B 7/06* | (2006.01) |
| *B60T 1/06* | (2006.01) |
| *B62D 63/08* | (2006.01) |
| *F02D 19/06* | (2006.01) |
| *F02D 41/00* | (2006.01) |
| *F02D 41/38* | (2006.01) |

(52) U.S. Cl.
CPC ............... *F02B 7/06* (2013.01); *F02B 7/08* (2013.01); *F02B 43/10* (2013.01); *F02D 19/10* (2013.01); *F02D 41/0025* (2013.01); *F02D 41/30* (2013.01); *F02D 41/3047* (2013.01); *F02D 41/402* (2013.01); *F02M 26/00* (2016.02); *F02B 2043/103* (2013.01); *F02D 19/0689* (2013.01); *F02D 19/0692* (2013.01); *F02D 41/0002* (2013.01); *F02D 41/005* (2013.01); *F02D 41/3094* (2013.01); *F02D 2041/0017* (2013.01); *F02D 2041/389* (2013.01); *Y02T 10/22* (2013.01); *Y02T 10/32* (2013.01); *Y02T 10/36* (2013.01); *Y02T 10/44* (2013.01)

(58) Field of Classification Search
CPC .. F02B 7/08; F02B 43/10; F02D 19/10; F02D 41/0025; F02D 41/30; F02D 41/3047; F02D 41/402; B60D 1/242
See application file for complete search history.

(56) References Cited

U.S. PATENT DOCUMENTS

| | | | | |
|---|---|---|---|---|
| 2,887,183 | A * | 5/1959 | Ross | B60T 7/20 188/106 R |
| 3,323,619 | A * | 6/1967 | Lacy | B60T 7/20 188/112 R |
| 3,666,060 | A * | 5/1972 | Schroter | B60T 7/206 188/112 R |
| 5,390,768 | A | 2/1995 | Borkowski | |
| 6,375,211 | B1 * | 4/2002 | MacKarvich | B60D 1/32 188/112 R |
| 9,174,614 | B2 * | 11/2015 | Mercure | B60D 1/065 |
| 2003/0201141 | A1 * | 10/2003 | Frye | B60T 7/20 188/112 R |
| 2011/0303502 | A1 * | 12/2011 | Mercure | B60D 1/065 188/2 D |

* cited by examiner

SAFETY BRAKE SYSTEM FOR TRAILERS

CROSS-REFERENCE TO RELATED APPLICATION(S)

This patent application claims priority from U.S. provisional patent application 61/385,666, filed on Sep. 23, 2010, the specification of which is hereby incorporated by reference.

FIELD OF THE APPLICATION

The present application relates to trailers such as domestic trailers and, more particularly, to a safety brake system used when trailers are unhitched or accidentally detached from a vehicle to block the wheels of the trailer.

BACKGROUND OF THE ART

Large trailers, such as those used in the freight industries, are equipped with braking systems in order to ensure that the tractor and trailer combination has enough braking power to safely transit on roads. Some trailers are commonly equipped with air brakes that are actuated from the tractor, which air brakes automatically lock the wheels of the trailer when the latter is unhitched.

Smaller trailers, for instance domestic trailers or trailers used to tow recreational vehicles (e.g., boat, motorcycle, ATV, etc.), are seldom provided with a braking system in order to keep their costs low.

Accordingly, the braking power is fully supplied by the vehicle towing the trailer. When the trailer is unhitched, random masses (e.g., log, plank, rock) are often wedged behind the wheels of the trailer so as to block movement of the trailer. This action of wedging is hazardous. Moreover, if the operator forgets to wedge a mass behind the wheels, the trailer might start moving if it is on a slope. With the inertia of the trailer and its contents, a moving trailer is hard to stop and may cause severe damages and/or injuries.

Also, some types of smaller trailers may have brake systems. The brake systems may operate with electric, pneumatic, hydraulic networks, among other possibilities. In most cases, the brake systems can only be actuated by actions from the vehicle towing the trailer.

SUMMARY OF THE APPLICATION

It is therefore an aim of the present application to provide a safety brake system for trailers that addresses issues associated with the prior art.

It is a further aim of the present application to provide a method for installing a safety brake system to a trailer of a vehicle.

Therefore, in accordance with a first embodiment of the present application, there is provided a safety brake system for a trailer comprising: a brake end comprising a brake unit adapted to be secured to a trailer and positioned to brake the trailer, the brake unit being biased toward braking the trailer; an actuation unit comprising: a mount adapted to be secured to a front end of the trailer; a brake interface operatively supported by the mount for displacement with respect to the trailer, the brake interface being operatively connected to the brake unit for deactivating the brake unit, the brake interface being displaceable toward a deactivation state in which the brake interface releases the brake unit from braking the trailer; a probe operatively supported by the mount for displacement with respect to the trailer, the probe being displaceable between a hitching state in which the probe is adapted to contact the hitch of a vehicle, and a blocking state in which the probe blocks a hitch coupler of the trailer to prevent hitching of the trailer to a vehicle; a biasing unit to bias the probe against the hitch of the trailer in the hitching state and toward the blocking state, such that the brake unit is actuated when the hitch is separated from the hitch coupler; and a mechanism operatively connecting the brake interface to the probe, the mechanism retaining the brake interface in the deactivated state when the probe is in the hitching state, the mechanism releasing the brake interface from the deactivated state when the probe moves to the blocking state.

Further in accordance with an embodiment of the present disclosure, the brake interface comprises a lever pivotally connected to the mount and manually displaceable to the deactivating state.

Still further in accordance with an embodiment of the present disclosure, the probe comprises an arm for being manually displaced away from the blocking state.

Still further in accordance with an embodiment of the present disclosure, a lock unit releasably immobilizes the arm and the brake interface with the brake unit braking the trailer and with the probe in the blocking state.

Still further in accordance with an embodiment of the present disclosure, a translational joint between the probe and mount for the probe to move in translation along the mount.

Still further in accordance with an embodiment of the present disclosure, the probe has a main body operatively supported on the mount rearward of the hitch coupler, and a probe end having a L-shape and having a portion positioned forward of the hitch coupler, with a movement from the hitching state to the blocking state being in a rearward direction.

Still further in accordance with an embodiment of the present disclosure, the probe end has a hook engaging with a flange of the hitch coupler in the blocking state.

Still further in accordance with an embodiment of the present disclosure, the biasing unit is a spring connected between the probe and the mount.

Still further in accordance with an embodiment of the present disclosure, a cable unit has a housing and wire, the wire axially displaceable in the housing, with the cable unit connected to the brake interface at a first end and to the brake unit at another end to transmit deactivation movement of the actuation end to the brake end.

Still further in accordance with an embodiment of the present disclosure, the brake unit has a brake mount per wheel adapted to be connected to the trailer, and at least one arm pivotally connected to the brake mount, to pivot to a braking contact with a rim of the wheel.

Still further in accordance with an embodiment of the present disclosure, the brake mount has two of said arms per wheel, with the two arms respectively providing braking contact to the rim for an own direction of rotation of the wheel.

Still further in accordance with an embodiment of the present disclosure, the mechanism comprises a detent pivotally mounted to the mount and biased against the probe for moving therewith, and a latch pivotally mounted to the mount and biased against the probe, the latch being in oriented for captive engagement with the brake interface by the detent when the probe is in the hitching state.

In accordance with another embodiment of the present disclosure, there is provided a method for deactivating a safety brake unit of a trailer, comprising: moving a probe away from a blocking state in which the probe blocks an access to a hitch coupler; coupling the hitch coupler to a hitch; and latching a brake interface into a deactivating state in which the brake interface releases the safety brake unit.

Further in accordance with the other embodiment of the present disclosure, the brake interface is manually moved to the deactivating state when the trailer is unhitched to release the safety brake unit to align the hitch and the hitch coupler prior to coupling same.

Still further in accordance with an embodiment of the present disclosure, a lock preventing movement of the probe and the brake interface is removed prior to moving the probe.

DESCRIPTION OF THE PREFERRED EMBODIMENTS

Referring to the drawings, and more particularly to FIGS. 1 to 4, a front end of a trailer is generally illustrated at 10, as equipped with a hitch coupler 11. An actuation end of the safety brake system of the present disclosure is illustrated at 12, whereas a brake end of the safety brake system is illustrated at 13 in FIGS. 5-8.

The trailer 10 is used to carry loads and is towed by a vehicle.

The actuation end 12 is used to actuate the brake system or wheel blocking system.

The brake end 13 performs the braking action to block the wheels of the trailer 10.

Figure 1:
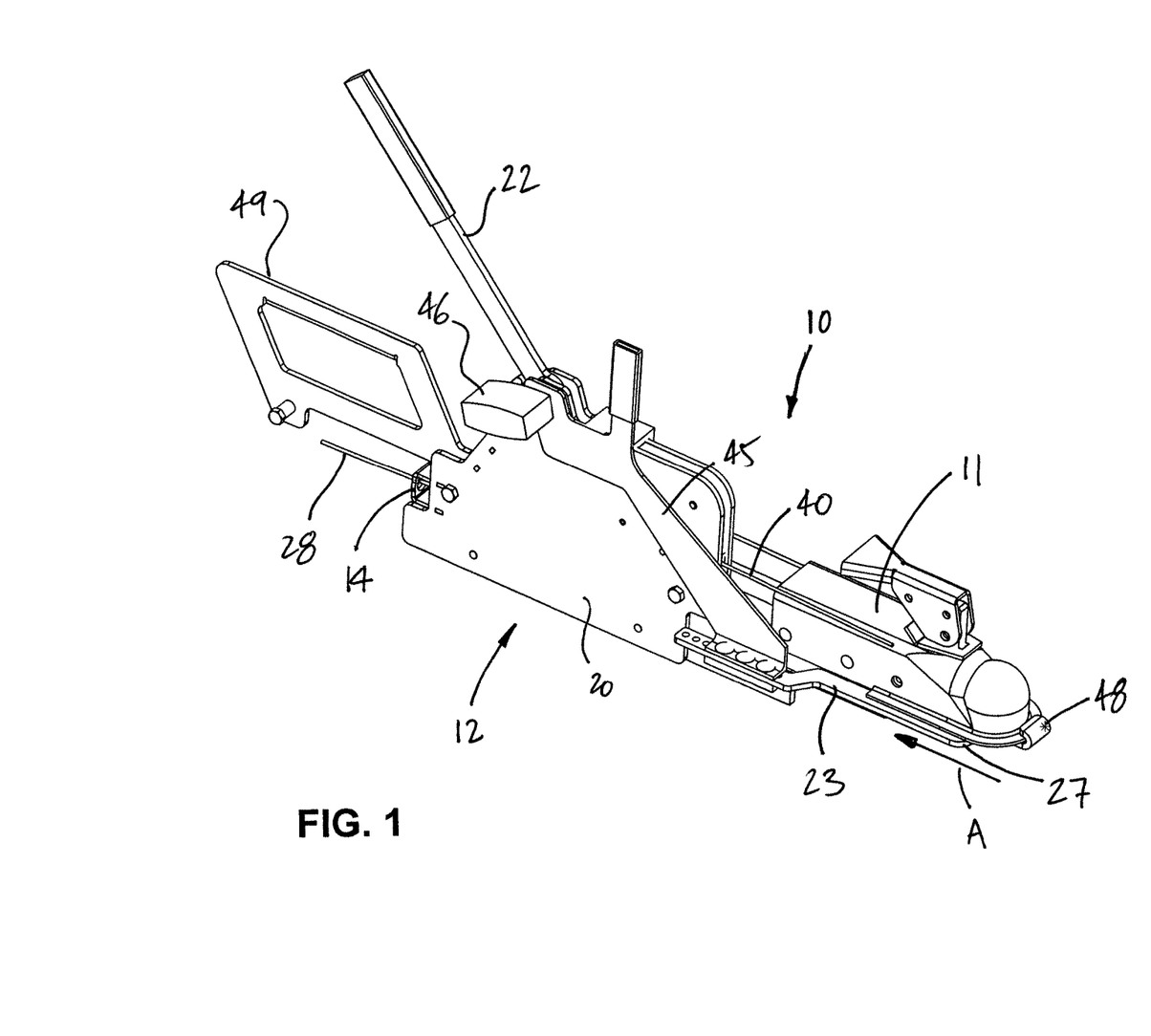
FIG. 1 is a perspective view of an actuation end of a safety brake system in accordance with an embodiment of the present application, in an unhitched state on a tongue of a trailer.
Figure 5:
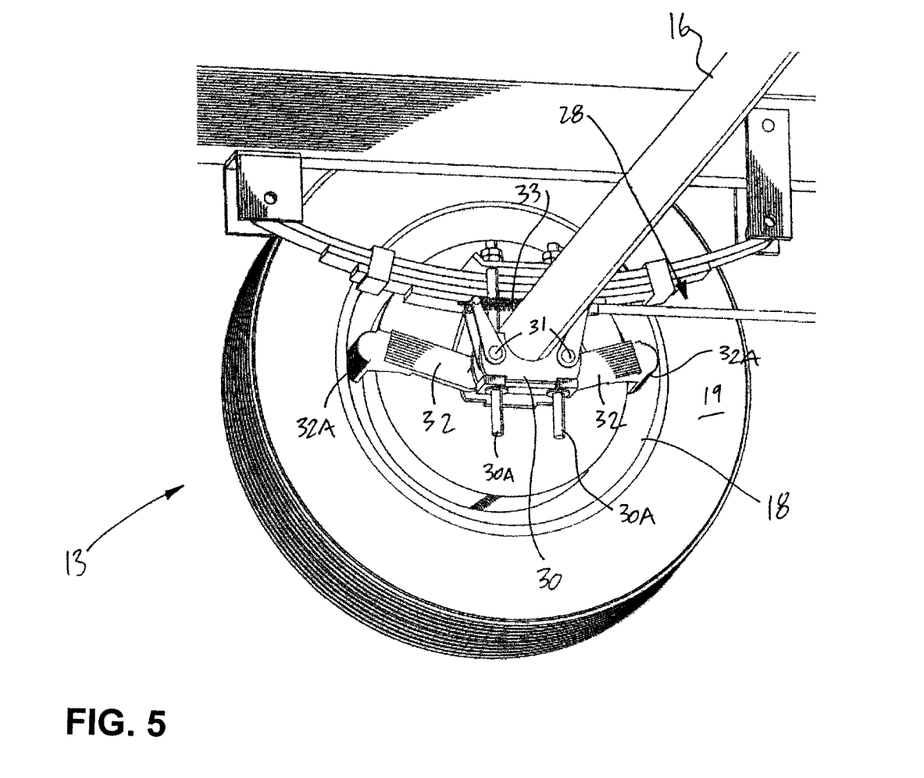
FIG. 5 is a perspective view of a braking end of the safety brake system in accordance with an embodiment of the present application, in the hitched state.

Referring to FIG. 1, both the hitch coupler 11 and the actuation end 12 are mounted to a tongue 14 of the trailer. It is well known that the tongue 14 is the interface between the trailer 10 and the vehicle towing the trailer 10. The hitch coupler 11 engages with a hitch 15 on the vehicle (e.g., ball hitch, fifth wheel loop or any other kind of hitch). As seen in FIG. 5, the brake end 13 of the safety brake system is mounted to the axle 16 of the trailer 10, so as to act on the rims 18 of the wheels 19 of the trailer 10.

Referring to FIG. 1, the actuation end 12 of the safety brake system is shown mounted to the trailer 10 but may alternatively be mounted to the vehicle or hitch of the vehicle. Accordingly, the actuation end 12 has a tongue mount 20 in the embodiment of FIG. 1. The tongue mount 20 is releasably or permanently secured to the tongue 14. For instance, the tongue mount 20 has a casing formed by a pair of spaced apart plates, in which the various components of the actuation end 12 are located. Any other configuration is considered such as a support plate and a pair of U-shaped connectors to secured the casing of the tongue mount 20 to the tongue 14, with the U-shaped connectors strapping the support plate to the tongue 14, by way of nuts or other appropriate fasteners.

The tongue mount 20 has a pivot 21 (FIG. 2), pivotally supporting a brake interface 22 (i.e., handle), referred to hereinafter as a lever 22 for simplicity. Let brake interface 22 may however have any appropriate configuration, such as a crank, a cam, an arm, etc. A probe 23 is slidingly mounted to the tongue mount 20, so as to translate along direction A, for instance using guide channels and followers (such as bolts), or any other appropriate translational joint. In the illustrated embodiment, the probe 23 slides between the two plates of the tongue mount 20.

The probe 23 is positioned adjacent to the hitch coupler 11 so as to be aligned with the hitch 15 of the vehicle (e.g., tow ball, etc.). More specifically, the probe 23 is biased with an appropriate spring (or any other suitable biasing unit) such that a probe end 27 of the probe 23 comes into contact with the hitch of the vehicle when the trailer 10 is hitched to the vehicle. In FIGS. 3 and 4, the probe end 27 is illustrated as being in contact with the hitch 15, in a hitched state of the safety brake system. In that state, the probe end 27 abuts against the hitch 15 of the vehicle, whereby it is retained from reaching the unhitched position of FIGS. 1 and 2. The unhitched position of FIGS. 1 and 2 corresponds to the braking state of the safety brake system.

A cable 28 interrelates the probe 23 to the brake end 13. The cable 28 transmits movements of the probe 23 to the brake of the brake end 13. In an embodiment, the cable 28 is of the type used in bicycle brakes, featuring a housing 28A accommodating a metallic wire 28B (FIG. 6), with the metallic wire 28B moving axially into the housing 28A. As is seen in FIG. 7, the housing 28A is connected to the tongue 14, whereas the metallic wire 28B is connected to the lever 22 (FIG. 2) or to any other part of the probe 23.

According to another embodiment, the actuation end 12 is connected to the brake end 13 by electrical wires. The movement of the probe 23 to the braking state is used to trigger a limit switch that sends a signal to the brake unit of the brake end 13. The brake unit may be electrically powered, or the electrical signal from the limit switch may be converted to mechanical, hydraulic, pneumatic forces to actuate the brake unit.

Figure 6:
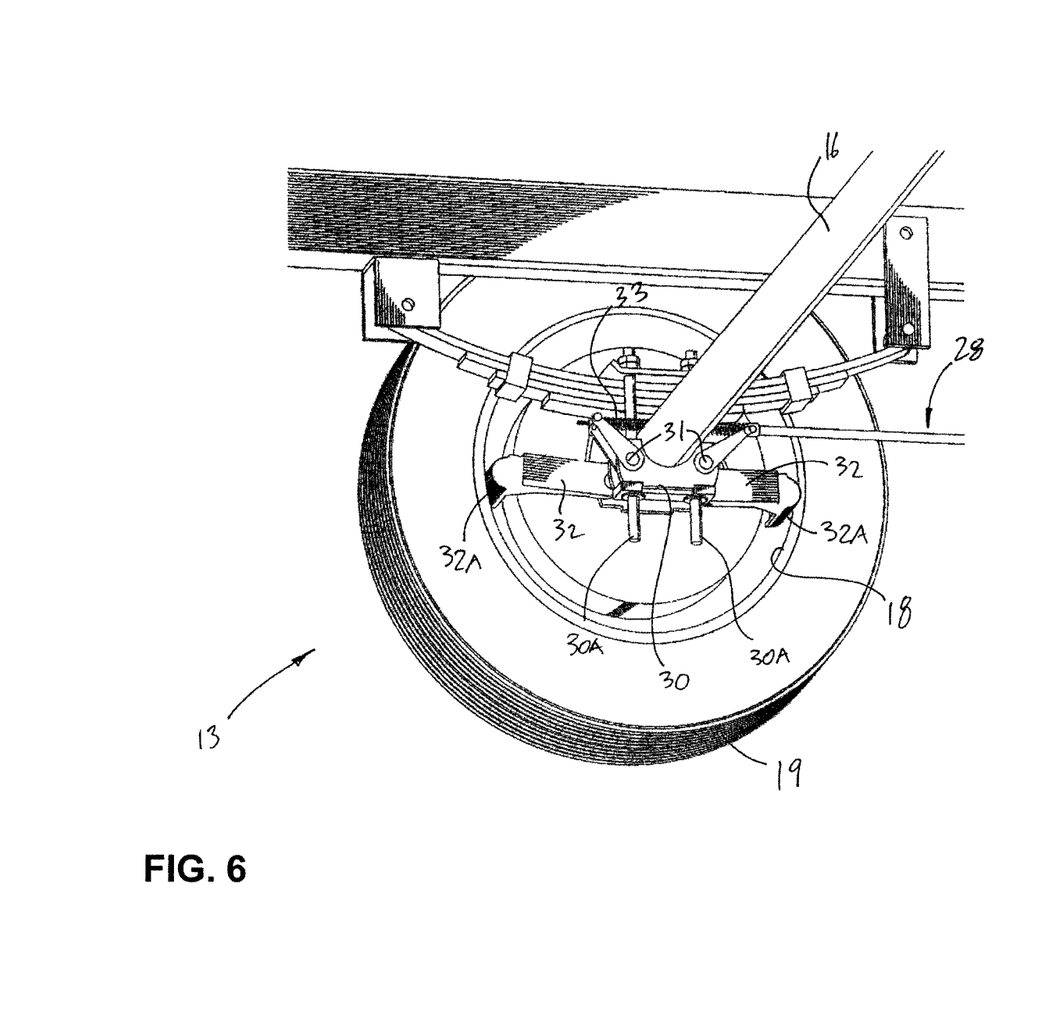
FIG. 6 is another perspective view of the braking end of FIG. 5, in the braking state.
Figure 7:
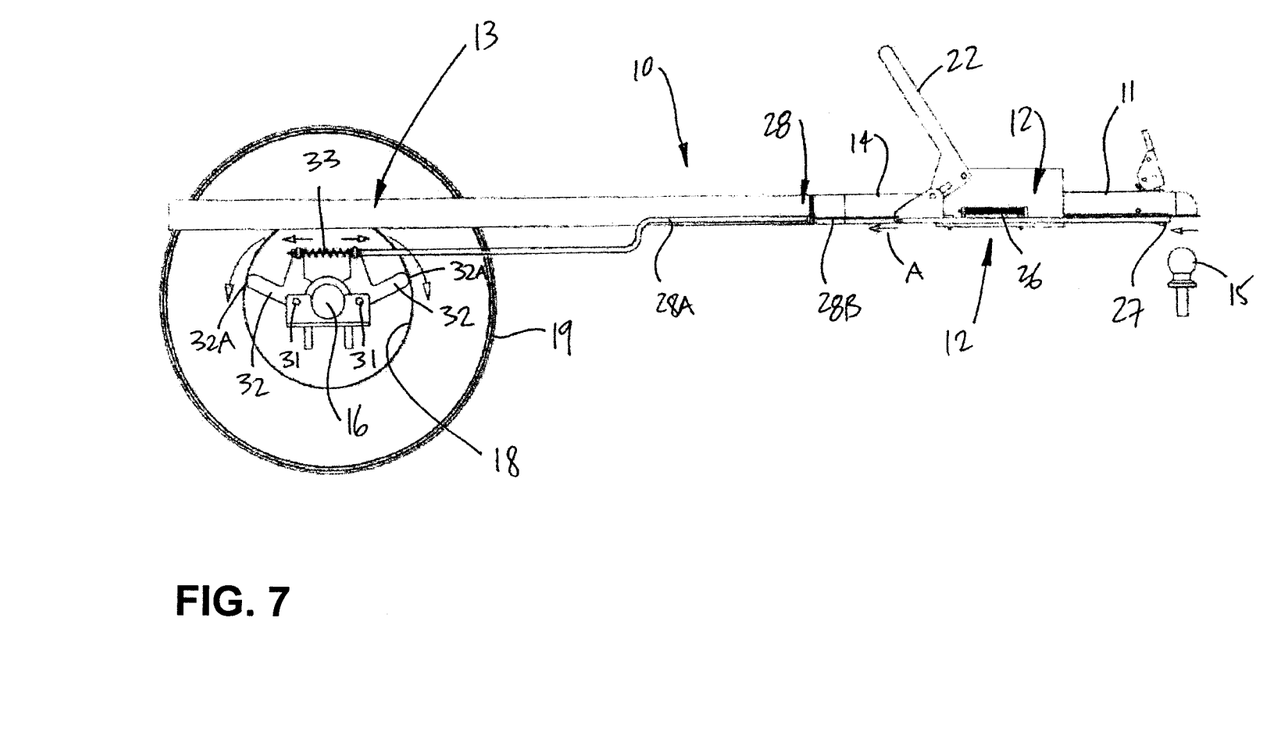
FIG. 7 is a schematic view of the safety brake system in the braking state.
Figure 8:
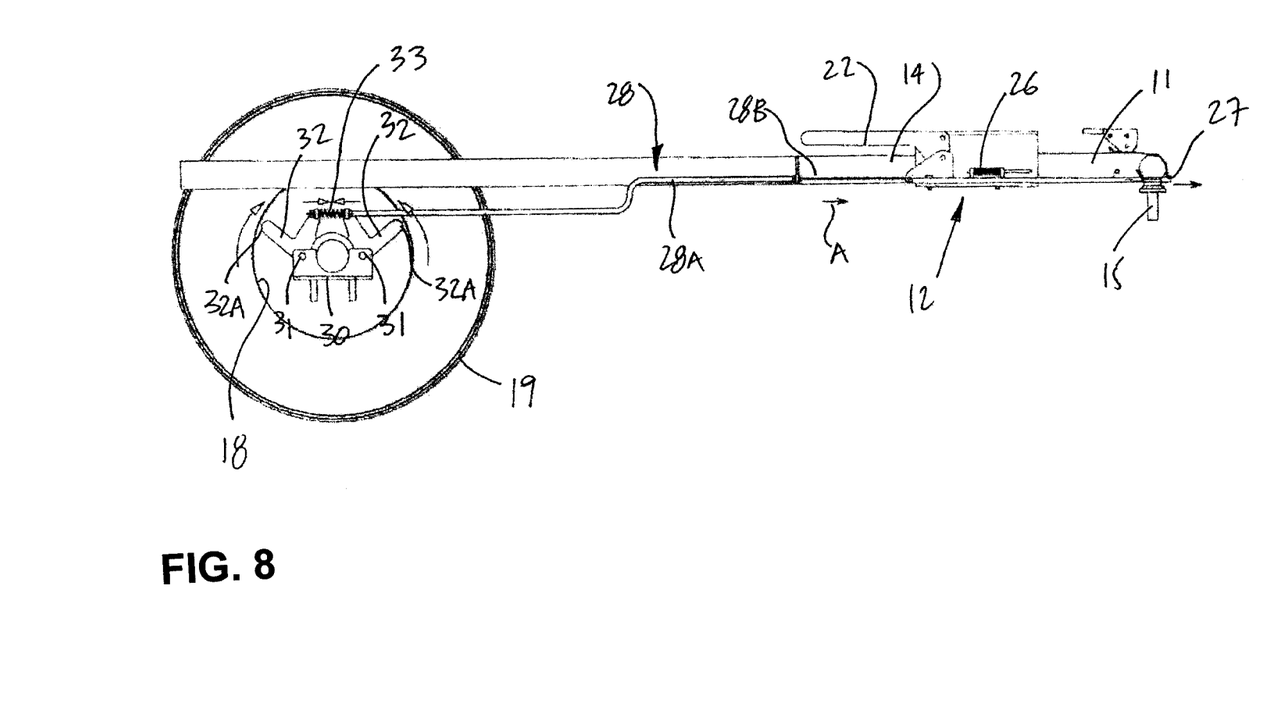
FIG. 8 is a schematic view of the safety brake system in the hitched state.

Referring to FIGS. 5 and 6, the brake end 13 has an axle mount 30 that is connected to the axle 16 so as to operatively position the brake end 13 opposite the wheel 19. In an embodiment, the axle mount 30 has a base placed against the axle 16, and secured thereto by bolts 30A. Alternatively, the axle mount 30 may have a support plate and U-shaped connectors, with the U-shaped connectors strapping the axle mount 30 to the axle 16, for instance with fasteners such as nuts or the like.

The axle mount 30 has pivots 31. A pair of arms 32 are pivotally connected to the support plate of the axle mount 30 by the pivots 31. The arms 32 have braking surfaces 32A that are adapted to contact the interior of the rim 18 of the wheel 19 in a braking action of the brake system.

A spring 33 is placed between the arms 32 away from the braking surfaces 32A, and biases the arms 32 away from one another. Accordingly, the spring 33 biases the arms 32 toward a pressing position against the rim 18, in a normal state of the brake end. The contact between the braking surfaces 32A (e.g., carbide teeth) and the rim 18 will cause braking friction acting against any rotation of the wheels 19. According to an embodiment, the arms 32 of a same wheel act separately, with one arm 32 for a clockwise rotation, and another arm 32 for a counterclockwise rotation. In FIGS. 5 and 6, the right-hand side arm 32 blocks the wheel 19 rotating clockwise, while the left-hand side arm 32 blocks the wheel 19 rotating counterclockwise.

The position of the pivots 31 and the length of the arms 32 is such that the pivoting courses of the braking surfaces 32A are limited at one end by the rim 18. Therefore, when the safety brake system is in the braking state, the spring 33 will bring one of the arms 32 into contact with the rim 18. As the arm 32 rotates in the same direction as the rim 18, the rim 18 will draw the arm 32 therewith, thereby increasing the blocking action of the arm 32 on the rim 18. As the forces involved in braking are substantial, the components of the brake end 13 must be sized to operate under and sustain such forces.

In similar fashion to a bicycle brake system, the wire 28B of the cable 28 is connected to the arms 32. Accordingly, a release of the wire 28B from the actuation end 12 (FIG. 1) (i.e., loosening the tension in the wire 28B) will result in one of the braking surfaces 32A contacting the rim 18, by the action of the spring 33. The spring (not shown) biasing the lever 22 at the actuation end 12 may provide additional force to that of the spring 33, although the spring 33 may be sufficient to bias the brakes and the lever 22. This biasing ensures that the brake system comes into contact with the wheel or wheels 19 when the trailer 10 is unhitched.

It is considered to provide a pair of the brake ends 13 for a single one of the actuation end 12. Although not shown, each brake end 13 may be positioned on its own wheel 19, while the cables 28 are both actuated from the same actuation end 13.

It is considered to provide the safety brake system in a retrofit kit that can be used with existing trailers, or existing brake systems of trailers. The safety brake system described above is mounted to common components of a trailer 10. The safety brake system may adopt other configurations as a function of the trailers that will use it. For instance, the brake end 13 may be mounted to a suspension, or to the trailer frame, and may block other parts of the wheel. Similarly, the actuation end 12 is not restricted to being mounted to the tongue 14, and may be mounted on the vehicle as well.

It is also considered to provide an additional arming unit in case the trailer 10 detaches from the vehicle while still being hitched (e.g., break of the hitch). Such an additional arming unit may be a chain or cable 40 connected to the vehicle at a first end by a hook or by any other suitable attachment, and to the mechanism of the actuation end 12 at another end. If the cable 40 provides a pulling force above a given magnitude (trailer 10 detaching from the vehicle), the cable 40 may actuate a detent to release the brakes.

Referring to FIGS. 1-4, the actuation end 12 features additional components used to keep the brake end 13 in a braking state despite the coupling of the coupler 11 to the hitch 15. An additional step of releasing the brakes must be manually performed once the trailer 10 is hitched. In this manner, if the trailer 10 is on uneven terrain, the operator may freely hitch the trailer 10 to the hitch 15 without disengaging the safety brakes. The safety brakes are deactivated once the trailer 10 is safely hitched to the vehicle.

Referring to FIG. 1, the probe 23 is shown in a blocking state, and therefore blocks the engagement of the coupler 11 onto the hitch 15. The probe 23 of this embodiment may move to the hitching state, independently of the lever 22, using arm 45, for the forward translation of the probe 23 (along direction A).

As shown in FIG. 1, a lock 46 may be used to prevent such displacement. The lock 46 is therefore used as an anti-theft feature, as the lock 46 keeps the lever 22 raised and therefore the safety brake system in a braking condition. It is pointed out that the metallic wire 28B must be concealed to avoid tampering therewith. Moreover, the lock 46 prevents the probe 23 to be moved toward the hitching state, thereby preventing the hitching of the trailer 10, by the probe 23 blocking the coupler 11. The lock 46 is received in appropriate holes in the lever 22, in the arm 45, and in a structural component that is integral with the tongue 14 (e.g., one of the plates of the tongue mount 20), which holes are generally illustrated at 47.

It is observed that the probe 23 has a hook 48, engaging with a flange of the coupler 11. The hook 48 adds structural integrity to the probe 23, for instance against any bending action that could be applied to the probe 23 to bend same out of the blocking position of FIG. 1.

Figure 2:
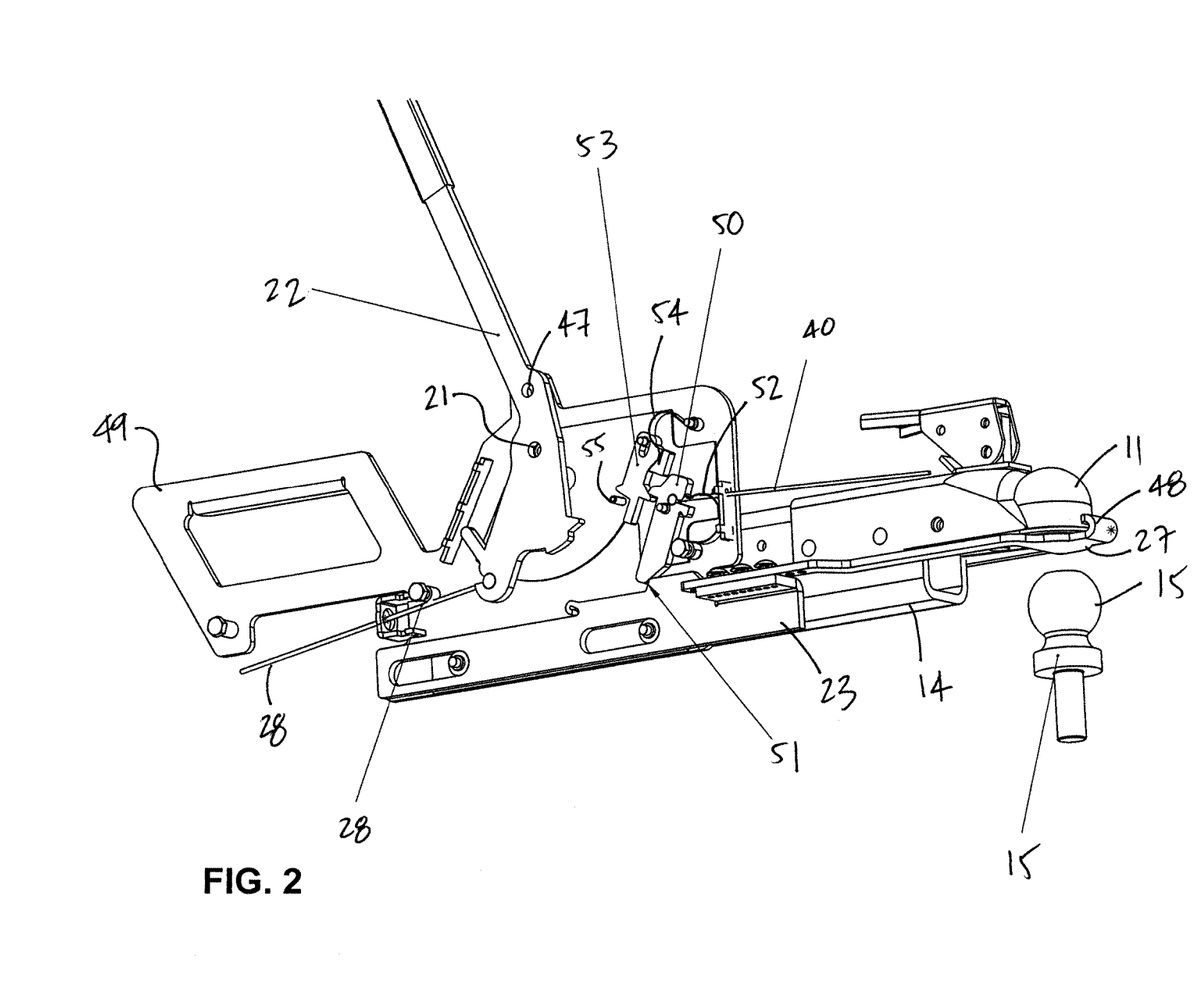
FIG. 2 is a perspective view, with parts removed, of the actuation end of FIG. 1 relative to a hitch, with a probe in a blocking state.
Figure 3:
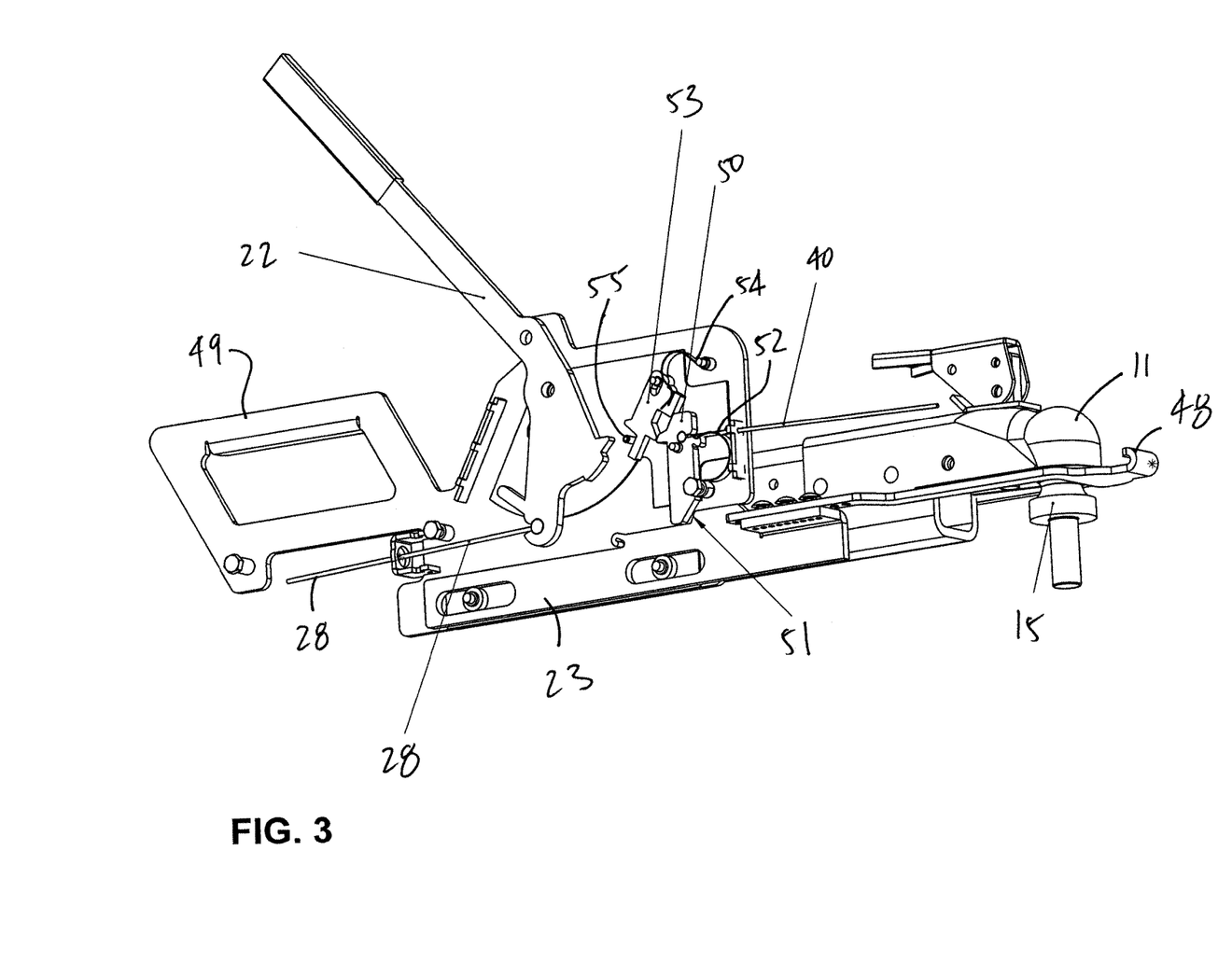
FIG. 3 is a perspective view, with parts removed, of the actuation end of FIG. 1, with the probe in a hitching state and with brakes being engaged.
Figure 4:
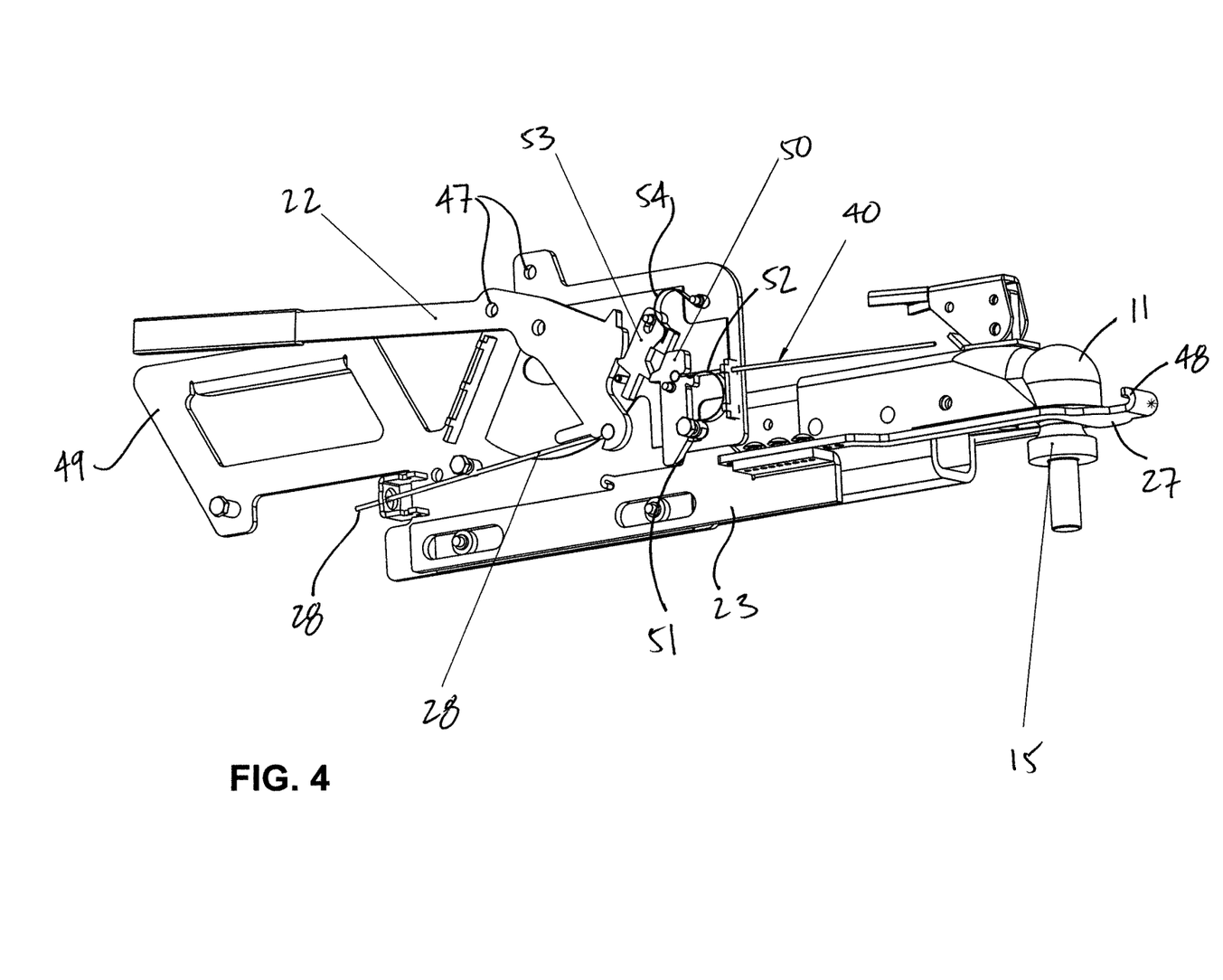
FIG. 4 is a perspective view, with parts removed, of the actuation end of FIG. 1, with the probe in a hitching state and the brakes being deactivated by a lever being in a deactivated state.

Referring to FIG. 2-4, an interior of the actuation end 12 is illustrated, which interior is otherwise concealed to avoid tampering. In FIG. 2, the probe end 27 blocks the coupler 11, and the lever 22 is raised. Accordingly, the trailer 10 cannot be hitched because of the probe end 27 of the probe 23 blocking the coupler 11 in the blocking state thereof, and the safety brake system is biased to its braking state (i.e., lever 22 being up), whereby the wheels are blocked and/or the trailer 10 is prevented from moving.

As shown in FIG. 4, the lever 22 may be temporarily lowered from its biased raised position of FIG. 2 to a deactivation state, to deactivate the brakes, and therefore allow movement of the trailer 10. The actuation end 12 may be equipped with a handle 49 to provide additional hold to an operator trying to keep the lever 22 in the deactivating state (e.g., FIG. 4) to deactivate the brakes, considering that the lever 22 is biased to the raised position of FIG. 2 by the normally biased condition of the brakes.

In FIG. 2, a detent 50 is held in a bypass position by abutment with abutment surface 51 of the probe 23, in spite of biasing component 52 (i.e., a leaf spring, but other types of springs may be used as well) biasing the detent 50 away from that bypass position of FIG. 2.

Referring to FIG. 3, the probe 23 has been displaced for the engagement of the coupler 11 to the hitch 15. Accordingly, the probe 23 is captive in the position of FIG. 3, by its contact with the hitch 15. Therefore, by moving the probe 23, the detent 50 is no longer kept in the bypass position of FIG. 2, but rather pivots to the blocking position of FIG. 3, as biased by the biasing component 52. As an effect of the biasing of the detent 50 to the blocking position, a latch 53 will move to a catching position as shown in FIG. 3, from a bypass position (FIG. 2). The latch 53 is held in the catching position (FIG. 3) by a pin 53A ensuring that the latch 53 is aligned with the lever 22. In the illustrated embodiment, both the detent 50 and the latch 53 are pivotally mounted to the tongue mount 14, although other joints could be used as well. The latch 53 is biased against the detent 50 by biasing component 54 (i.e., a leaf spring, but other types of springs may be used as well).

In the catching position of FIG. 3, the latch 53 has an abutment 55 that is in the path of the lever 22, as shown in FIG. 4. Therefore, once the coupler 11 is coupled to the hitch 15, the operator must lower the lever 22 so as to disarm the brakes of the safety brake system. In reaching the deactivation state of FIG. 4, the lever 22 is held captive by the latch 53, whereby the brakes are kept in their disarmed state. To allow the latching of the lever 22, the latch 53 moves against the biasing action of the biasing component 52, with the detent 50 also pivoting temporarily away from the blocking position, to then bias the latch 53 into captive engagement with the lever 22.

In order to apply the brakes from the configuration of FIG. 4, the detent 50 must be moved out of the blocking position of FIG. 4, to allow the lever 22 to bias back to its raised position of FIG. 3, as actuated by the normal biasing of the brakes. The detent 50 may be actuated by the return of the probe 23 to the unhitched position, in which case the abutment surface 51 pushes the detent 50 to the bypass position of FIG. 2. Alternatively, the detent 50 may move to the bypass position as a result of a pulling action exerted on any safety cable. Accordingly, when the trailer 10 is unhitched accidentally or voluntarily, the brakes will be actuated to brake the trailer 10.

Other mechanism configurations may be used as well to implement the functions of the safety brake system as described for FIGS. 1-4.

According to an embodiment, in order to deactivate the safety brake system, the probe 23 is moved away from the blocking state of FIG. 2, in which blocking state the probe 23 blocks an access to the hitch coupler 11. The probe 23 is moved away by a manual pull on the arm 45.

The hitch coupler 11 may be coupled to the hitch 15 as the probe 23 is in the hitching state. The brake interface 22 is then latched into its deactivating state, whereby the brake interface 22 releases the safety brake unit. The brake interface 22 may be moved manually to the deactivating state when the trailer is unhitched, to release the safety brake unit and thus align the hitch 15 and the hitch coupler 11 prior to coupling same. The lock 46 that prevents movement of the probe and the brake interface must be removed prior to moving the various components.

Figure 9:
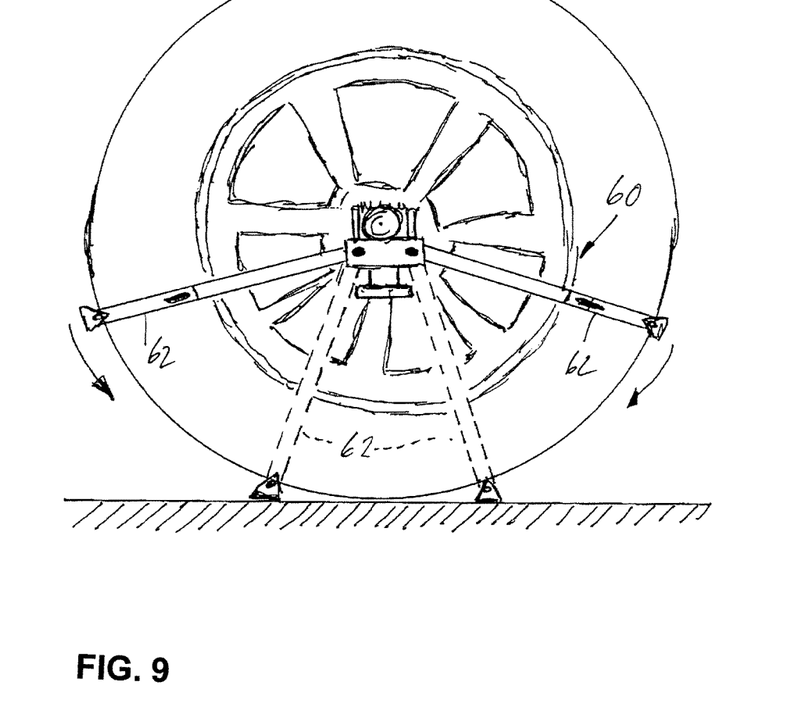
FIG. 9 is a schematic view of a braking end of the safety brake system, in accordance with yet another embodiment of the present disclosure.

Referring to FIG. 9, there is illustrated a road-contacting braking unit 60 that is used at the brake end 13, in addition to or alternatively to the arms 32. The braking unit 60 has one or more legs 62, displaceable between a contact position (in dotted lines) in which the legs 62 contact the ground, and a by-pass position, in which the legs 62 are retracted so as not to interfere with the road. The braking unit 60 may be interfaced with the actuation end 12 in similar fashion to the arms 32, and may be mounted to the wheel in any appropriate manner.

The safety brake system may be provided with any single one of the lever 22, the probe 23 or the additional arming unit (i.e., in case of a breakage of the hitch), or any combination thereof. For instance, the safety brake system may be provided with a manually actuated lever 22 only, or with any combination.

The probe 23 is illustrated in FIG. 1 for use with a standard ball hitch coupler 11. It is however considered to design a probe and/or actuation end for use with any other type of hitch system. For instance, the actuation end 12 may be designed for use with a fifth-wheel coupling system, or any other type of system.

In another embodiment, the safety brake system is designed to apply more braking power to one of the two wheels of the trailer 10. For instance, more braking power may be applied to the right-hand wheel of the trailer 10, to cause a right-hand path of movement to the trailer 10. It is known that in most countries the shoulder is on the right side of the road, whereby the right-hand path would safety direct the trailer 10 to the shoulder, as opposed to the opposing lane of incoming vehicles. Alternatively, the braking power may be greater on the left-hand wheel for countries in which the shoulder is on the left-hand side of the road. In order to provide more braking power on one of the wheels, the clearance between the braking surfaces 32A and the rim 18 are smaller for one of the two rims 18.

I claim:

1. A safety brake system for a trailer comprising:
   a brake end comprising a brake unit adapted to be secured to a trailer and positioned to brake the trailer, the brake unit being biased toward braking the trailer;
   an actuation unit comprising:
      a mount adapted to be secured to a front end of the trailer;
      a brake interface operatively supported by the mount for displacement with respect to the trailer, the brake interface being operatively connected to the brake unit for deactivating the brake unit, the brake interface being displaceable toward a deactivation state in which the brake interface releases the brake unit from braking the trailer;
      a probe operatively supported by the mount for displacement with respect to the trailer, and a mechanism directly connecting the probe to the brake unit for transmission of movements from the probe to the brake unit, the probe being displaceable between a hitching state in which the probe is adapted to contact a hitch of a vehicle, and a blocking state in which the probe blocks a hitch coupler of the trailer to prevent hitching of the trailer to the vehicle; and
      a biasing unit to bias the probe against the hitch of the trailer in the hitching state and toward the blocking state, such that the brake unit is automatically actuated when the hitch is separated from the hitch coupler by automatic biased displacement of the probe to the blocking state resulting in automatic transmission of movement of the mechanism to the brake unit to actuate the brake unit;
   wherein the mechanism operatively connects the brake interface to the probe, the mechanism retaining the brake interface in the deactivated state when the probe is in the hitching state, the mechanism releasing the brake interface from the deactivated state when the probe moves to the blocking state, the mechanism having a latch for manually latching the brake interface to the deactivated state when the probe moves from the blocking state to the hitching state.

2. The safety brake system according to claim 1, wherein the brake interface comprises a lever pivotally connected to the mount and manually displaceable to the deactivating state.

3. The safety brake system according to claim 1, wherein the probe comprises an arm for being manually displaced away from the blocking state.

4. The safety brake system according to claim 3, comprising a lock unit releasably immobilizing the arm and the brake interface with the brake unit braking the trailer and with the probe in the blocking state.

5. The safety brake system according to claim 1, comprising a translational joint between the probe and mount for the probe to move in translation along the mount.

6. The safety brake system according to claim 1, wherein the probe has a main body operatively supported on the mount rearward of the hitch coupler, and a probe end having a L-shape and having a portion positioned forward of the hitch coupler, with a movement from the hitching state to the blocking state being in a rearward direction.

7. The safety brake system according to claim 6, wherein the probe end has a hook engaging with a flange of the hitch coupler in the blocking state.

8. The safety brake system according to claim 1, wherein the biasing unit is a spring connected between the probe and the mount.

9. The safety brake system according to claim 1, further comprising a cable unit having a housing and wire, the wire axially displaceable in the housing, with the cable unit connected to the brake interface at a first end and to the brake unit at another end to transmit deactivation movement of the actuation unit to the brake end.

10. The safety brake system according to claim 1, wherein the brake unit has a brake mount per wheel adapted to be connected to the trailer, and at least one arm pivotally connected to the brake mount, to pivot to a braking contact with a rim of the wheel.

11. The safety brake system according to claim 10, wherein the brake mount has two of said arms per wheel, with the two arms respectively providing braking contact to the rim for any direction of rotation of the wheel.

12. The safety brake system according to claim 1, wherein the mechanism comprises a detent pivotally mounted to the mount and biased against the probe for moving therewith, and the latch pivotally mounted to the mount and biased against the probe, the latch being oriented for captive engagement with the brake interface by the detent when the probe is in the hitching state.

13. A method for deactivating a safety brake unit of a trailer, comprising:
   automatically displacing a probe to a blocking state in which the probe blocks an access to a hitch coupler, resulting in automatic actuation of the safety brake unit;
   moving the probe away from the blocking state with the safety brake unit remaining actuated;
   coupling the hitch coupler to a hitch with the safety brake unit remaining actuated; and
   latching a brake interface into a deactivating state in which the brake interface releases the safety brake unit from actuation.

14. The method according to claim 13, further comprising manually moving the brake interface to the deactivating state when the trailer is unhitched to release the safety brake unit to align the hitch and the hitch coupler, prior to coupling the hitch and the hitch coupler.

15. The method according to claim 13, further comprising removing a lock preventing movement of the probe and the brake interface prior to moving the probe.

* * * * *